(12) United States Patent
Riou et al.

(10) Patent No.: US 10,280,839 B2
(45) Date of Patent: May 7, 2019

(54) ACOUSTIC TREATMENT PANEL

(71) Applicant: SAFRAN AIRCRAFT ENGINES, Paris (FR)

(72) Inventors: Georges Jean Xavier Riou, Melun (FR); Jacky Novi Mardjono, Nogent sur Marne (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 140 days.

(21) Appl. No.: 15/513,798

(22) PCT Filed: Sep. 23, 2015

(86) PCT No.: PCT/FR2015/052543
§ 371 (c)(1),
(2) Date: Mar. 23, 2017

(87) PCT Pub. No.: WO2016/046494
PCT Pub. Date: Mar. 31, 2016

(65) Prior Publication Data
US 2018/0230905 A1 Aug. 16, 2018

(30) Foreign Application Priority Data

Sep. 24, 2014 (FR) ..................................... 14 59015

(51) Int. Cl.
| | |
|---|---|
| *B32B 3/12* | (2006.01) |
| *B32B 3/26* | (2006.01) |
| *F02C 7/045* | (2006.01) |
| *G10K 11/172* | (2006.01) |
| *B32B 7/12* | (2006.01) |

(52) U.S. Cl.
CPC ................ *F02C 7/045* (2013.01); *B32B 3/12* (2013.01); *B32B 3/266* (2013.01); *B32B 7/12* (2013.01); *G10K 11/172* (2013.01); *B32B 2305/024* (2013.01); *B32B 2305/026* (2013.01); *B32B 2305/18* (2013.01); *B32B 2307/102* (2013.01)

(58) Field of Classification Search
CPC ............ B32B 3/12; B32B 3/266; F02C 7/045
USPC ........................................................ 181/292
See application file for complete search history.

(56) References Cited

U.S. PATENT DOCUMENTS

| | | | |
|---|---|---|---|
| 3,734,234 A | 5/1973 | Wirt | |
| 3,819,007 A * | 6/1974 | Wirt | .......................... E04B 1/86 |
| | | | 181/286 |
| 3,831,710 A | 8/1974 | Wirt | |

(Continued)

FOREIGN PATENT DOCUMENTS

GB 2 300 081 A 10/1996

OTHER PUBLICATIONS

International Search Report dated Feb. 22, 2016, in PCT/FR2015/052543, filed Sep. 23, 2015.

*Primary Examiner* — Jeremy A Luks
(74) *Attorney, Agent, or Firm* — Oblon, McClelland, Maier & Neustadt, L.L.P.

(57) ABSTRACT

An acoustic treatment panel including a cellular structure core sandwiched between a solid skin and a perforated skin, and a plurality of domes made of porous fabric and extending from at least one of the skins into the insides of the cells of the cellular structure towards the other skin so as to define at least two resonant cavities inside each cell of the cellular structure.

12 Claims, 4 Drawing Sheets

(56) References Cited

U.S. PATENT DOCUMENTS

| | | | | |
|---|---|---|---|---|
| 3,887,031 | A * | 6/1975 | Wirt | E04B 1/86 |
| | | | | 181/286 |
| 3,952,831 | A | 4/1976 | Bernard et al. | |
| 5,445,861 | A * | 8/1995 | Newton | B32B 3/12 |
| | | | | 428/116 |
| 5,760,349 | A * | 6/1998 | Borchers | B64G 1/002 |
| | | | | 181/286 |
| 6,274,216 | B1 | 8/2001 | Gonidec et al. | |
| 6,352,134 | B1 * | 3/2002 | Wang | E01F 8/0023 |
| | | | | 181/292 |
| 6,536,556 | B2 * | 3/2003 | Porte | B32B 3/12 |
| | | | | 181/284 |
| 8,047,329 | B1 * | 11/2011 | Douglas | G10K 11/172 |
| | | | | 181/292 |
| 9,643,392 | B2 * | 5/2017 | Butler | G10K 11/172 |
| 2012/0037448 | A1 | 2/2012 | Douglas et al. | |
| 2012/0285768 | A1 | 11/2012 | Douglas et al. | |

* cited by examiner

ACOUSTIC TREATMENT PANEL

BACKGROUND OF THE INVENTION

The present invention relates to the general field of so-called "passive" acoustic treatment.

The field of application of the invention is particularly, but not exclusively, the field of aviation turbine engines.

The use of passive acoustic treatment panels is frequent in the field of aviation for reducing noise emissions given off by turbine engines. For example, for a turbojet of the two-spool bypass type, such panels may be arranged on the inside face of the nacelle of the turbojet, and also on the inside and outside faces of its primary cover.

A passive acoustic treatment panel is generally in the form of a cellular honeycomb structure covered in a thin porous layer acting as a wall for the air-flow passage and closed at the other end by a layer that is reflective from an acoustic point of view (also referred to as a "solid" skin).

Panels that are more complex, with intermediate porous layers inserted between honeycomb structure layers may be provided in order to extend attenuation over a wider range of frequencies. By way of example, reference may be made to publication U.S. Pat. No. 3,948,346, which describes an example architecture for a two-layer acoustic panel having two cellular structures that are sandwiched between a solid skin and a perforated skin, and that are separated from each other by a metal sheet that is likewise perforated.

The two-layer acoustic treatment panel described in that document U.S. Pat. No. 3,948,346 possesses numerous drawbacks, such as being of relatively complex design, presenting considerable weight, and of having sub-optimal mechanical strength.

OBJECT AND SUMMARY OF THE INVENTION

There thus exists a need to have available a two-layer passive acoustic treatment panel that does not present the above-mentioned drawbacks.

For this purpose, the invention provides an acoustic treatment panel comprising a cellular structure core sandwiched between a solid skin and a perforated skin, and a plurality of domes made of porous fabric and extending from at least one of the skins into the insides of the cells of the cellular structure towards the other skin so as to define at least two resonant cavities inside each cell of the cellular structure, the domes being partially obstructed.

The presence of a single cellular structure sandwiched between the two skins makes it possible to simplify the design of such a two-skin acoustic treatment panel since it requires only one cellular structure. The mechanical strength of the panel is also enhanced by the presence of a single cellular structure. Furthermore, the domes made of porous fabric that define at least two resonant cavities in each cell of the cellular structure enable the overall weight of the acoustic treatment panel to be considerably lightened.

The partial obstruction of the domes makes it possible to reduce the flow head losses of the domes made of porous fabric (and thus their acoustic resistance).

In an embodiment, the domes form a single layer of porous fabric assembled to at least one of the skins.

In another embodiment, the domes are independent of one another and they are fastened to a unitary structure.

Under such circumstances, the unitary structure may comprise a plurality of filaments that are mounted inside the cells of the cellular structure and that are connected to one another by crossing the cells through notches made in the cell walls, the domes being fastened inside said filaments.

Alternatively, the unitary structure may comprise a trellis that is fastened on one of the skins and that includes a plurality of bases on which the domes are fastened. Under such circumstances, each base is preferably made from a large mesh fabric in order to facilitate adhesive bonding between the cellular structure and the corresponding skin.

The domes may be made of a porous fabric made of polymer, metal, or glass. Furthermore, each dome may be bullet-shaped or pyramid-shaped.

The invention also provides a turbine engine including at least one acoustic treatment panel as defined above.

The invention also provides a method of fabricating an acoustic treatment panel, the method comprising:

forming a cellular structure core presenting a first opening face for the cells and a second opening face for the cells;

laying a solid skin on the first opening face for the cells; and laying a perforated skin on the second opening face for the cells;

the method being characterized in that the laying of at least one of the two skins includes previously adhesively bonding a plurality of domes made of porous fabric to the corresponding skin, the domes bonded to a skin extending from said skin into the insides of the cells of the cellular structure towards the other skin so as to define at least two resonant cavities inside each cell of the cellular structure once the cellular structure has been assembled.

In a first aspect of the fabrication method, the method may include, prior to bonding domes on a skin, shaping a single layer of porous fabric into a layer of domes for bonding to the corresponding skin.

In a second aspect of the fabrication method, different from the first aspect, bonding the domes to a skin comprises fastening each dome to a unitary structure independently the other domes.

In that configuration, the unitary structure comprises a trellis, each dome being fastened to the unitary structure by fastening the trellis to one of the skins, the trellis including a plurality of bases to which the domes are fastened.

In a third aspect of the fabrication method, the method may further include partially obstructing the pores of the fabric domes assembled inside the cells of the cellular structure of the panel.

BRIEF DESCRIPTION OF THE DRAWINGS

Other characteristics and advantages of the present invention appear from the following description made with reference to the accompanying drawings, which show implementations having no limiting character. In the figures.

DETAILED DESCRIPTION OF THE INVENTION

Figure 1:
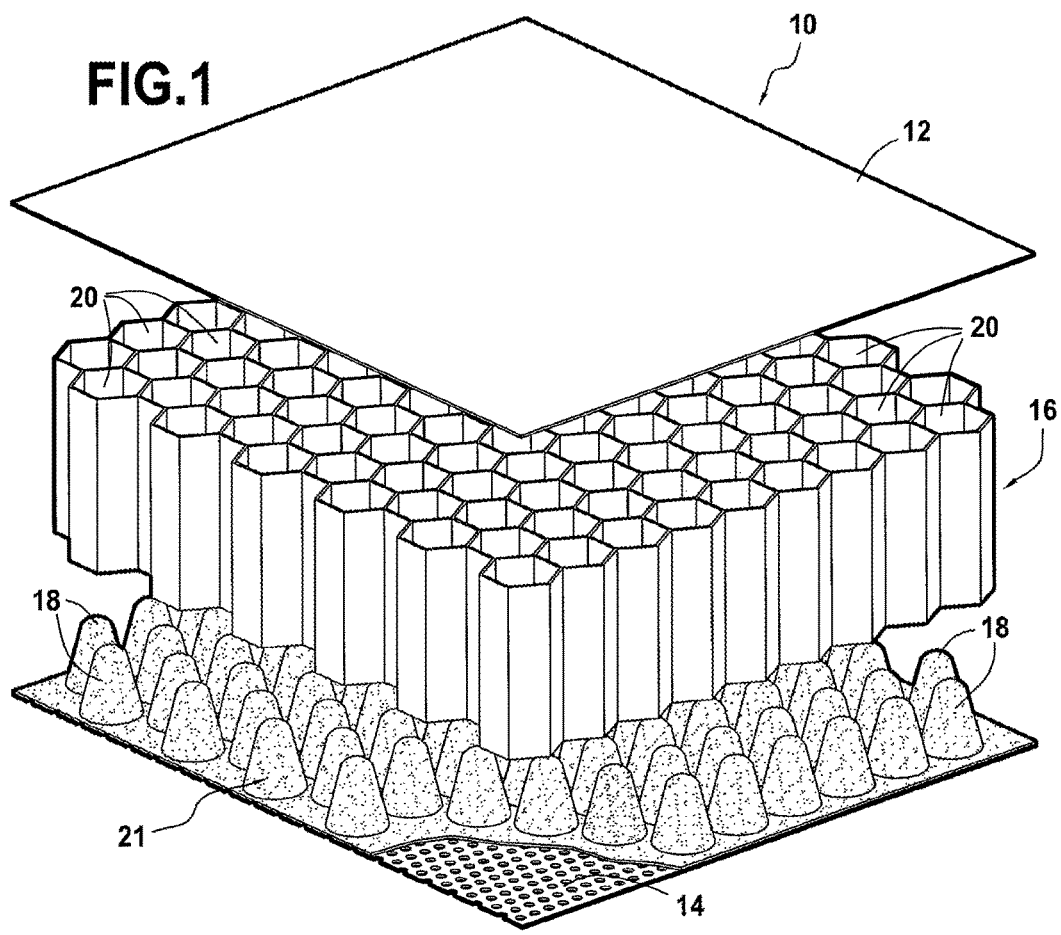
FIG. 1 is an exploded perspective view of an acoustic treatment panel in a first embodiment of the invention.

The invention relates to a passive acoustic treatment panel, in particular a panel of the type fitted to an aircraft turbojet, such as the panel shown in FIG. 1.

By way of example, such passive acoustic treatment panels may be positioned on the inside face of the nacelle of a turbojet in order to attenuate the sound nuisance that it generates. Such panels could also be positioned on the outside face of the primary cover around the high-pressure compressor and the combustion chamber of the turbojet, or indeed on the inside face of the primary cover downstream from the low-pressure turbine.

Figure 2:
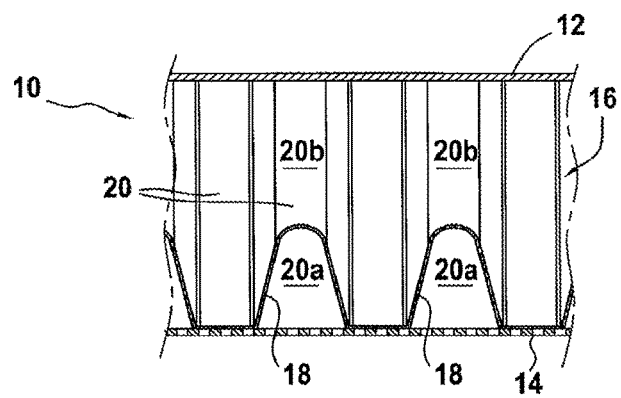
FIG. 2 is a section view of the FIG. 1 panel.

The acoustic treatment panel 10 shown in FIGS. 1 and 2 is said to be a "two layer" panel, i.e. it provides treatment having two stages of honeycomb structure (the treatment is of the "double resonator" type).

According to the invention, the panel 10 has a solid skin 12, a perforated skin 14, and a single core 16 of honeycomb structure that is sandwiched between the two skins 12 and 14.

The panel 10 also has a plurality of domes 18 that are made of porous fabric. These porous fabric domes 18 are fastened (e.g. by adhesive) onto one of the skins 12, 14 of the panel (the perforated skin 14 in the example shown in FIGS. 1 and 2), from which they project into the insides of the cells 20 of the honeycomb structure 16 towards the other skin (i.e. the solid skin 12).

As a result, as shown in FIG. 2, each porous fabric dome 18 is housed inside a cell 20 of the cellular structure so as to define at least two resonant air cavities 20a, 20b therein.

More precisely, one of the two air cavities (the cavity 20a in FIG. 2) is formed by the volume defined by the corresponding dome 18 and by the perforated skin 14, and the other air cavity (cavity 20b) is formed by the remaining volume in the cell 20.

The fabric used for forming the domes 18 may be a porous fabric made of polymer, metal, or glass. By way of example, the fabric may present thickness of the order of 0.2 millimeters (mm) to 0.4 mm.

Furthermore, the porosity of the fabric is selected in particular as a function of the area of the dome 18 that defines the two air cavities 20a and 20b so as to confer the looked-for acoustic properties on the acoustic treatment panel.

Furthermore, in the embodiment of FIGS. 1 and 2, the domes 18 are fastened to the perforated skin 14. Naturally, the domes 18' could equally well be fastened to the solid skin 12, as can be seen on the panel 10' shown as a variant in FIG. 3.

Likewise, the acoustic treatment panel could have two series of domes, one fastened to the solid skin and the other to the perforated skin, each extending inside a cell of the cellular structure so as to define three resonant air cavities therein. Such a configuration thus performs treatment of the "triple resonator" type.

Furthermore, it is possible to vary the shapes of the porous fabric domes 18 that are positioned inside each cell 20 of the cellular structure 16 of the panel in order to define at least two air cavities. Thus, in the embodiment of FIGS. 1 and 2, each of these domes 18 has a rounded shape somewhat reminiscent of the shape of an egg box.

Figure 3:
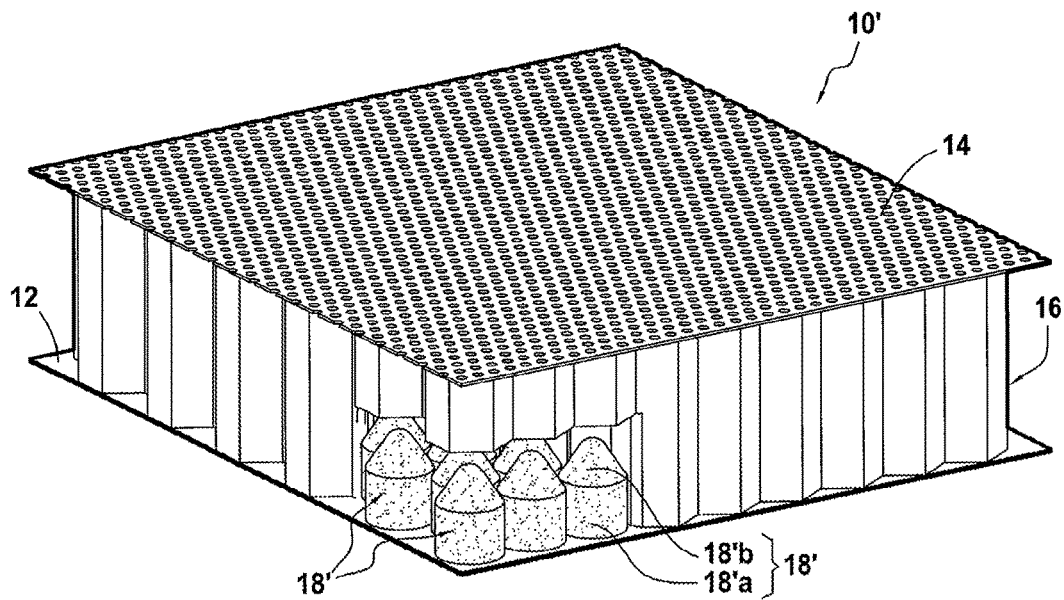
FIG. 3 is an exploded perspective view of an acoustic treatment panel in a second embodiment of the invention.

In the embodiment shown in FIG. 3, each of the porous fabric domes 18' is geometrically bullet-shaped, i.e. it has a base 18'a that is substantially cylindrical and that is extended by a terminal portion 18'b that is conical in shape.

Figure 4:
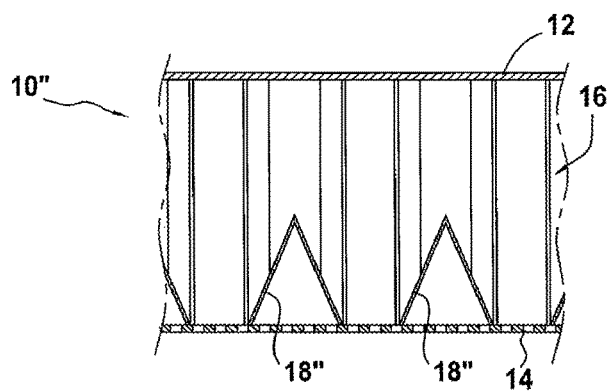
FIG. 4 is a section view of an acoustic treatment panel in a third embodiment of the invention.

In the embodiment shown in FIG. 4, the panel 10" has a plurality of porous fabric domes 18", each of which is geometrically pyramid-shaped.

Whatever their geometrical shape, the porous fabric domes of the panel subdivide the inside of each cell 20 of the cellular structure 16 into at least two resonant air cavities.

Furthermore, in the preferred embodiment of FIGS. 1 and 2, the domes 18 of the panel 10 form a single layer 21 of porous fabric that is fastened (e.g. by adhesive) to the perforated skin 14.

Figure 5A:
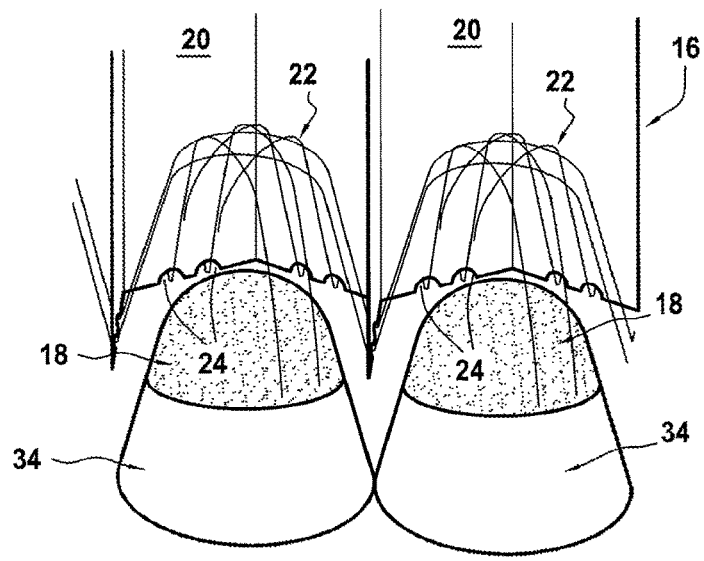
FIGS. 5A to 5C are views showing different dome assemblies of acoustic treatment panels in yet other embodiments of the invention.
Figure 5B:
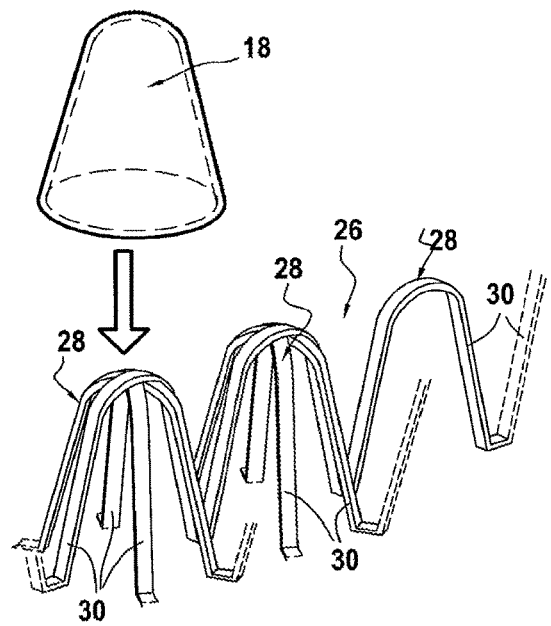
Figure 5C:
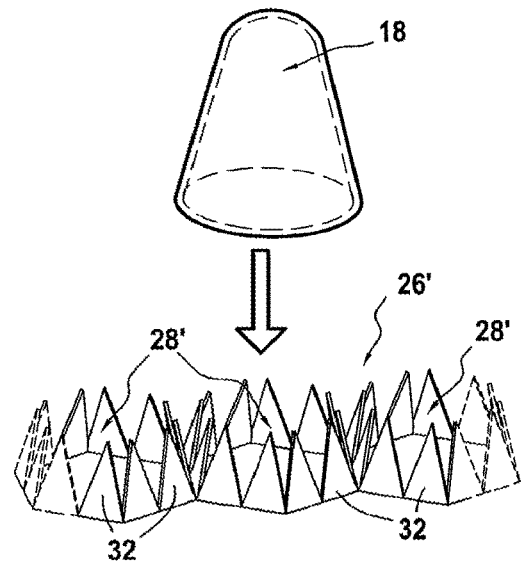

In order to mitigate the difficulty of preparing a porous fabric layer woven as a single piece with a plurality of domes, it is possible, as shown in FIGS. 5A to 5C, to make unit domes (i.e. domes that are independent of one another) each of which is fastened to the corresponding skin of the panel and/or to the cellular structure thereof.

Thus, in the embodiment shown in FIG. 5A, the domes 18 are unit domes and they are fastened to the cellular structure 16 by filaments 22 mounted inside the cells 20 of the cellular structure and connected to one another by passing through the cells via notches 24 formed in the walls of the cells.

More precisely, the filaments, e.g. made of a polymer material or of metal, are shaped so as to take up the shape of the domes 18 to which they are fastened (e.g. by adhesive). The domes are mounted inside the filaments of complementary shape and they are fastened thereto.

Furthermore, the filaments 22 form a single unit structure that runs from one cell to another by passing through notches 24 formed in the walls of the cellular structure defining these cells 20.

In the embodiment shown in FIG. 5B, the domes 18 are unitary and they are fastened to the corresponding skin by means of a trellis 26 that forms a single unitary structure and that provides a plurality of bases 28 on which the domes are fastened.

The trellis 26 may thus be made up of three connection strips 30 that are arranged so as to form bases 28 of shape complementary to the domes. More precisely, the connection strips 30 run from one cell of the cellular structure to another by passing under the cell walls. They are adhesively bonded both to the corresponding skin and to the walls of the cells of the cellular structure.

Furthermore, the connection strips 30 are preferably made from a large mesh fabric, e.g. a 0.2 mm to 0.4 mm fabric, so as to facilitate adhesive bonding between the cellular structure and the skin on which the domes 18 are assembled.

In a variant of this embodiment (not shown), the connection strips may be fitted directly on the domes by adhesive. This variant makes it possible, advantageously, to obtain a saving in weight.

In the embodiment shown in FIG. 5C, the domes 18 are unitary and they are likewise fastened to the corresponding skin by means of a trellis 26' that forms a single unitary structure and that is formed by a plurality of bases 28' to which the domes are fastened.

In this example, each of the bases 28' is in the form of a hexagon adhesively bonded to the skin and provided with tongues 32 of triangular shape to which the domes 18 are adhesively bonded.

As before, these bases 28' are preferably made from a large mesh fabric so as to facilitate adhesive bonding between the cellular structure and the skin to which the domes 18 are assembled.

It should be observed that acoustic optimization of the acoustic treatment panel of the invention may require partially obstructing the pores in the fabric domes assembled inside the cells of the cellular structure of the panel.

For this purpose, and as shown in FIG. 5A, it is possible to cover some of the domes in part by a resin or by a nonporous fabric 34 for obstructing the pores in the porous tissue of the covered domes.

Figure 6:
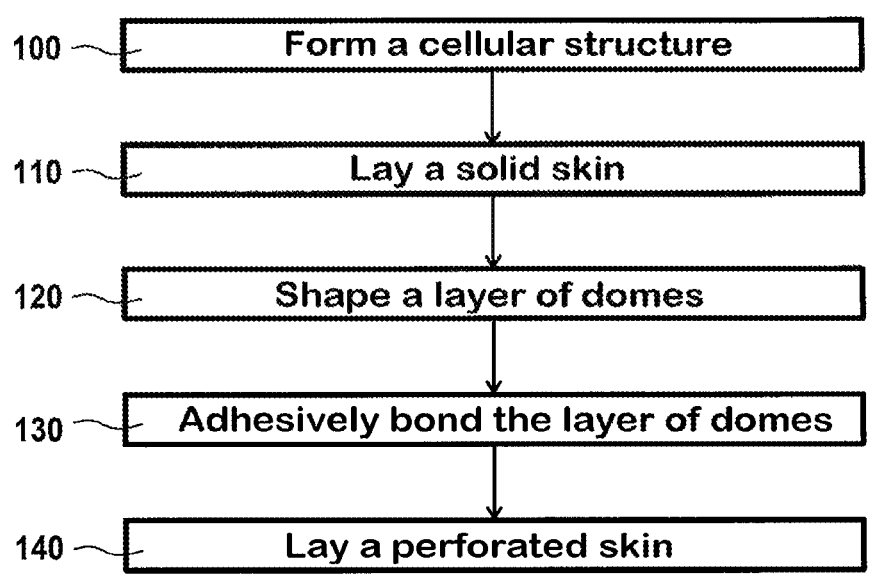
FIG. 6 shows a flowchart of a method of fabricating an acoustic treatment panel in an implementation of the invention.

In FIG. 6 there can be seen a flowchart of a method of fabricating an acoustic treatment panel in an implementation of the invention.

In a first step 100 of the fabrication method, a cellular structure core 16 is formed having first and second opening faces for the cells 20. The term "opening face for the cells 20" is used to mean a face of the cellular structure 16 into which the cells 20 open out.

In a second step 110, a solid skin 12 is placed on the first opening face of the cells 20 in order to close the first opening face of the cells 20.

In a third step 120, a single layer of porous tissue is selected and shaped so as to present a two-dimensional array of domes 18. The layer as shaped in this way is then ready to be adhesively bonded to the perforated skin 14.

In a variant, prior to the second step 110, the fabrication method may include a step of shaping another porous fabric layer so as to present a two-dimensional array of domes 18, said layer being for bonding to the solid skin 12.

In a fourth step 130, the porous fabric layer including the plurality of domes is adhesively bonded to the perforated skin 14, and then in a fifth step 140, the perforated skin 14 assembled with the layer of porous fabric presenting the plurality of domes 18 is placed on the second opening face of the cells 20.

Once the acoustic treatment panel has been assembled, the domes 18 on the perforated skin 14 extend from the perforated skin 14 into the inside of the cells 20 of the cellular structure 16 towards the solid skin 12 so as to define at least two resonant cavities 20a and 20b inside each cell 20 of the cellular structure 16.

The invention claimed is:

1. An acoustic treatment panel comprising:
   a cellular structure core sandwiched between a solid skin and a perforated skin; and
   a plurality of domes made of porous fabric and extending from one of the solid or perforated skins into insides of cells of the cellular structure towards the other of the solid or perforated skins so as to define at least two resonant cavities inside each cell of the cellular structure,
   wherein the domes are partially obstructed,
   wherein the domes are independent of one another and are fastened to a unitary structure, and
   wherein a portion of the unitary structure is inserted in each cell of the cellular structure.

2. The panel according to claim 1, wherein the domes form a single layer of porous fabric assembled to at least one of the solid or perforated skins.

3. The panel according to claim 1, wherein the unitary structure comprises a plurality of filaments that are mounted inside the cells of the cellular structure and that are connected to one another by crossing the cells through notches made in walls thereof, the domes being fastened inside said filaments.

4. The panel according to claim 1, wherein the unitary structure comprises a trellis that is fastened on one of the solid or perforated skins and that includes a plurality of bases on which the domes are fastened.

5. The panel according to claim 4, wherein each base is made from a large mesh fabric.

6. The panel according to claim 1, wherein the domes are made of a porous fabric made of polymer, metal, or glass.

7. The panel according to claim 1, wherein each of the domes is bullet-shaped or pyramid-shaped.

8. A turbine engine comprising:
   an acoustic treatment panel comprising:
      a cellular structure core sandwiched between a solid skin and a perforated skin; and
      a plurality of domes made of porous fabric and extending from one of the solid or perforated skins into insides of cells of the cellular structure towards the other of the solid or perforated skins so as to define at least two resonant cavities inside each cell of the cellular structure,
   wherein the domes are partially obstructed,
   wherein the domes are independent of one another and are fastened to a unitary structure, and
   wherein a portion of the unitary structure is inserted in each cell of the cellular structure.

9. A method of fabricating an acoustic treatment panel, the method comprising:
   forming a cellular structure core presenting a first opening face for cells and a second opening face for the cells;
   laying a solid skin on the first opening face for the cells; and
   laying a perforated skin on the second opening face for the cells;
   wherein the laying of at least one of the two skins includes previously adhesively bonding a plurality of domes made of porous fabric to the corresponding skin, the domes bonded to a skin extending from said skin into the insides of the cells of the cellular structure towards the other skin so as to define at least two resonant cavities inside each cell of the cellular structure once the cellular structure has been assembled,
   wherein the domes are independent of one another and are fastened to a unitary structure, and
   wherein a portion of the unitary structure is inserted in each cell of the cellular structure.

10. The method according to claim 9, further comprising, prior to bonding domes on a skin, shaping a single layer of porous fabric into a layer of domes for bonding to the corresponding skin.

11. The method according to claim 9, wherein the unitary structure comprises a trellis, each dome being fastened to the unitary structure by fastening the trellis to one of the solid or perforated skins, the trellis including a plurality of bases to which the domes are fastened.

12. The method according to claim 9, including partially obstructing the pores of the fabric domes assembled inside the cells of the cellular structure of the panel.

* * * * *